US012140072B2

(12) United States Patent
Feng et al.

(10) Patent No.: US 12,140,072 B2
(45) Date of Patent: Nov. 12, 2024

(54) SYSTEM FOR PROVIDING MOBILE POWER

(71) Applicant: Yantai Jereh Petroleum Equipment & Technologies Co., Ltd., Yantai (CN)

(72) Inventors: Ning Feng, Yantai (CN); Xin Li, Yantai (CN); Ting Zhang, Yantai (CN); Libin Zhou, Yantai (CN); Lili Wang, Yantai (CN); Wanchun Zha, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 78 days.

(21) Appl. No.: 17/863,430

(22) Filed: Jul. 13, 2022

(65) Prior Publication Data

US 2022/0341362 A1 Oct. 27, 2022

Related U.S. Application Data

(63) Continuation-in-part of application No. 17/737,033, filed on May 5, 2022, now Pat. No. 11,927,129, (Continued)

(30) Foreign Application Priority Data

Jun. 25, 2019 (CN) ........................ 201910552699.5

(51) Int. Cl.
*F02B 61/04* (2006.01)
*F01D 15/10* (2006.01)
(Continued)

(52) U.S. Cl.
CPC ............ *F02B 63/047* (2013.01); *F01D 15/10* (2013.01); *E21B 43/26* (2013.01); *F05D 2240/90* (2013.01)

(58) Field of Classification Search
CPC .... F02B 63/047; E21B 43/26; E21B 43/2607; F05D 2240/90; F05D 2220/76; F05D 2260/02; F01D 25/28
See application file for complete search history.

(56) References Cited

U.S. PATENT DOCUMENTS 7,819,209 B1 10/2010 Bezner
9,534,473 B2 * 1/2017 Morris .................... F01D 25/30
(Continued)

FOREIGN PATENT DOCUMENTS

CN 201231703 Y 5/2009
CN 107208557 A 9/2017
CN 110145399 A 8/2019

OTHER PUBLICATIONS

International Search Report dated on May 19, 2020, corresponding PCT/CN2019/101627, with English translation, 5 pages.
(Continued)

*Primary Examiner* — Joseph Ortega
(74) *Attorney, Agent, or Firm* — XSENSUS LLP

(57) ABSTRACT

The present invention discloses a system for providing mobile power, in which the required equipment for the power supply system at fracturing fields as well as connection cables and connection hoses are integrated properly, assigned onto three transport vehicles for movement and effectively connected. Intake components and a turbine generation system are combined on a first transport vehicle and installed together, then transported to customer sites directly, thus saving the installation time at the user sites. The two different designs on the locations of an exhaust stack and an exhaust silencer not only meet the requirements of road transportation, but also meet the requirements of exhaust gas emission during operations.

18 Claims, 4 Drawing Sheets

Related U.S. Application Data which is a continuation of application No. 16/837,110, filed on Apr. 1, 2020, now Pat. No. 11,448,122.

(51) Int. Cl.

| | |
|---|---|
| ***F02B 63/04*** | (2006.01) |
| *E21B 43/26* | (2006.01) |

(56) References Cited

U.S. PATENT DOCUMENTS

| | | | | |
|---|---|---|---|---|
| 2016/0177675 | A1 | 6/2016 | Morris et al. | |
| 2016/0369609 | A1 | 12/2016 | Morris et al. | |
| 2018/0080376 | A1 | 3/2018 | Austin et al. | |
| 2019/0204021 | A1 * | 7/2019 | Morris .................... | F28F 27/00 |
| 2020/0088202 | A1 | 3/2020 | Sigmar et al. | |
| 2020/0408147 | A1 | 12/2020 | Zhang et al. | |

OTHER PUBLICATIONS

Written Opinion dated on May 19, 2020, corresponding PCT/CN2019/101627, 5 pages.

* cited by examiner

SYSTEM FOR PROVIDING MOBILE POWER

CROSS-REFERENCE TO RELATED APPLICATIONS

The present application is a continuation-in-part of U.S. application Ser. No. 17/737,033, filed May 5, 2022, which is a continuation of U.S. application Ser. No. 16/837,110, filed Apr. 1, 2020, which claims priority to Chinese Patent Application No. 201910552699.5, filed Jun. 25, 2019 with the Chinese Patent Office, each of which is incorporated herein by reference in its entirety.

TECHNICAL FIELD

The present invention relates to the technical field of power generation, and specifically to a system for providing mobile power.

BACKGROUND

The oil and gas industry generally adopts hydraulic fracturing to promote the production of hydrocarbon wells (for example, oil or gas wells). Conventional fracturing equipment generally has the problems of occupying a large area, causing severe environmental pollution and so on, failing to satisfy the increasingly serious environmental requirements and the requirements on the area occupied by well-site operations.

A complete set of electric drive fracturing equipment will effectively reduce the discharge of environmental pollutants, the occupied area, noise and the operation and maintenance costs. With the use of a complete set of electric drive fracturing equipment and the continuous increase of the power of the electric drive fracturing equipment, higher requirements are imposed on power supply at the operation site. At the well-site, the power supply for fracturing equipment generally cannot be realized by using a power grid. Moreover, the fracturing operation has the characteristic of short operation cycle, and fracturing equipment needs to be moved among different well-sites. Generally, because various parts of a power supply system require different assembly, transportation and installation processes, the installation time of the power supply system will be up to half to one month.

Therefore, how to provide a mobile power supply system which can be installed quickly and conveniently at the electric drive fracturing operation site is currently a great challenge for electric drive fracturing operations.

SUMMARY

To overcome the deficiencies in the prior art, an objective of the present invention is to provide a system for providing mobile power, in which the required equipment for the power supply system at fracturing fields as well as connection cables and connection hoses are integrated properly, assigned onto three transport vehicles for movement and effectively connected, realizing the quick movement and quick installation of the power supply system at the fracturing fields.

The objective of the present invention is achieved by the following technical measures: A system for providing mobile power, including a turbine generation transportation unit, an exhaust transportation unit and an auxiliary system transportation unit; the auxiliary system transportation unit and the exhaust transportation unit are connected to at least one side of the turbine generation transportation unit; the turbine generation transportation unit includes intake components, a gas turbine, a generator and a first transport vehicle, and the intake components, the gas turbine and the generator are connected in sequence and disposed on the first transport vehicle; the exhaust transportation unit includes a mobile accessory, an exhaust stack, an exhaust silencer, an exhaust joint and a second transport vehicle, and the mobile accessory, the exhaust stack, the exhaust silencer and the exhaust joint are disposed on the second transport vehicle.

Further, the turbine generation transportation unit further includes an electric power unit and a control system, the electric power unit is configured to output electric power from the generator, and the control system includes a gas turbine control unit and a generator control unit.

Further, the intake components are disposed at a forward travel direction end of the first transport vehicle and connected to the gas turbine through intake joints.

Further, the intake components include an intake silencer and an intake filter.

Further, the auxiliary system transportation unit includes a gas supply skid, a water washing system, a fire fighting system, a lubrication system, a ventilation system, other auxiliary system and a third transport vehicle; the gas supply skid, the water washing system, the fire fighting system, the lubrication system, the ventilation system and the other auxiliary system are disposed on the third transport vehicle.

Further, the exhaust stack is hinged with the exhaust silencer; during transportation, the exhaust stack and the exhaust silencer are arranged side by side, while in working state, the exhaust stack is disposed on the top of the exhaust silencer.

Further, the exhaust stack can rotate 180° around the hinge point.

Further, different shapes of exhaust joints can be arranged according to the customer's site environment.

Further, the shape of the exhaust joint is a vertical cylinder or an elbow.

Compared with the prior art, the present invention has the following beneficial effects:

1. Intake components and a turbine generation system are combined on one transport vehicle and installed together, then transported to customer sites directly, thus saving the installation time at the user sites.
2. The intake components are disposed at a forward travel direction end of the first transport vehicle, and connected horizontally to the turbine generation system, properly integrating the spatial arrangement of all equipment on the first transport vehicle and facilitating the transportation.
3. The connection between the exhaust stack and the exhaust silencer of two different location relationships at transportation and working states not only meets the requirements of road transportation, but also meets the requirements of exhaust gas emission during operations.
4. The exhaust transportation unit is further provided with a mobile accessory (mainly including hoses, cables and the like used for connecting the auxiliary system transportation unit and the turbine generation transportation unit at working sites), so that the connection hoses and cables at power supply sites can be effectively arranged and collected together to reduce the workload required for connecting the cables and hoses at sites.
5. The exhaust joint can be arranged as a vertical cylinder or elbow type, so that the exhaust transportation unit can be connected to the turbine generation transportation unit in a T-shape or side by side, so as to better meet the site environment of different customers.

The present invention will be described in detail below with reference to the accompanying drawings and specific implementations.

Figure 1:
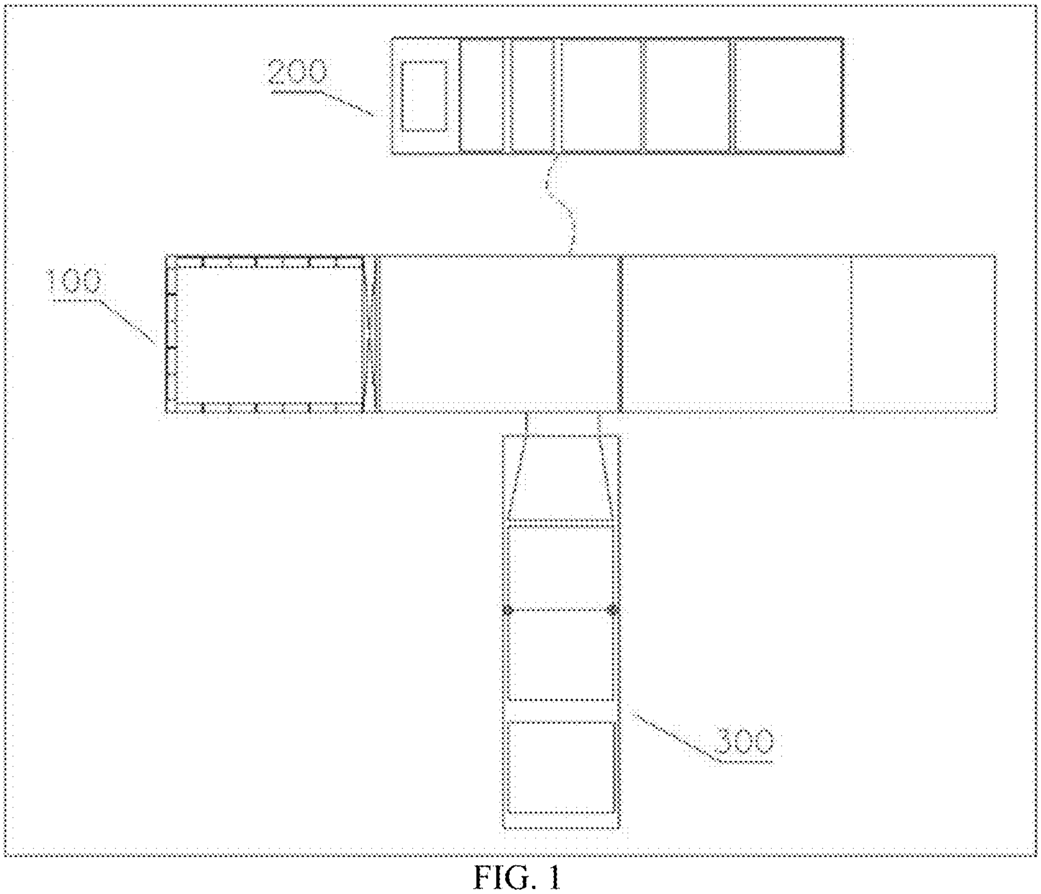
FIG. 1 is a schematic diagram of the overall structure of a mobile power system provided by at least one embodiment of the present disclosure.
Figure 2:
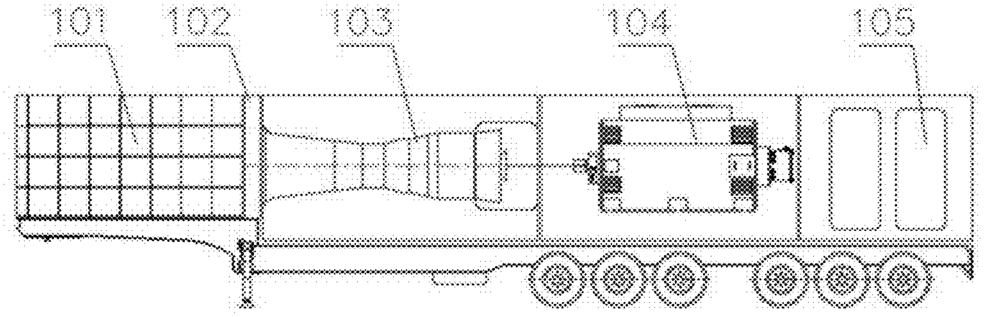
FIG. 2 is a schematic structural diagram of a turbine generation transportation unit provided by at least one embodiment of the present disclosure.
Figure 3:
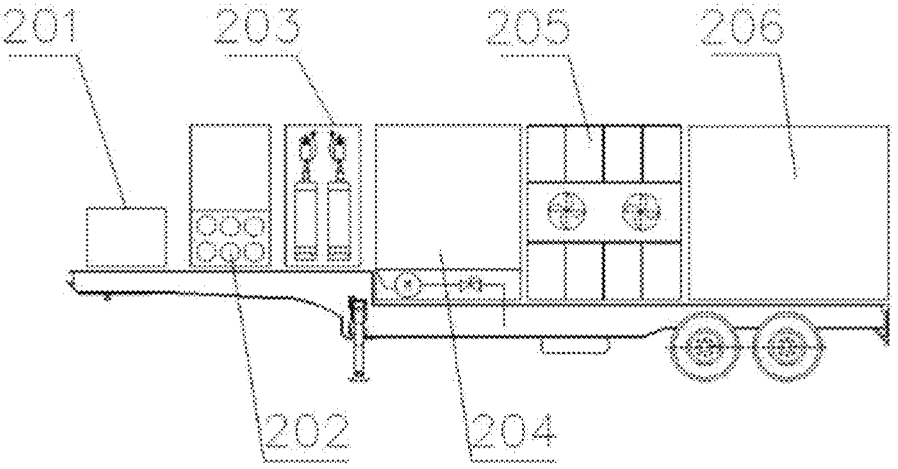
FIG. 3 is a schematic structural diagram of an auxiliary system transportation unit provided by at least one embodiment of the present disclosure.
Figure 4:
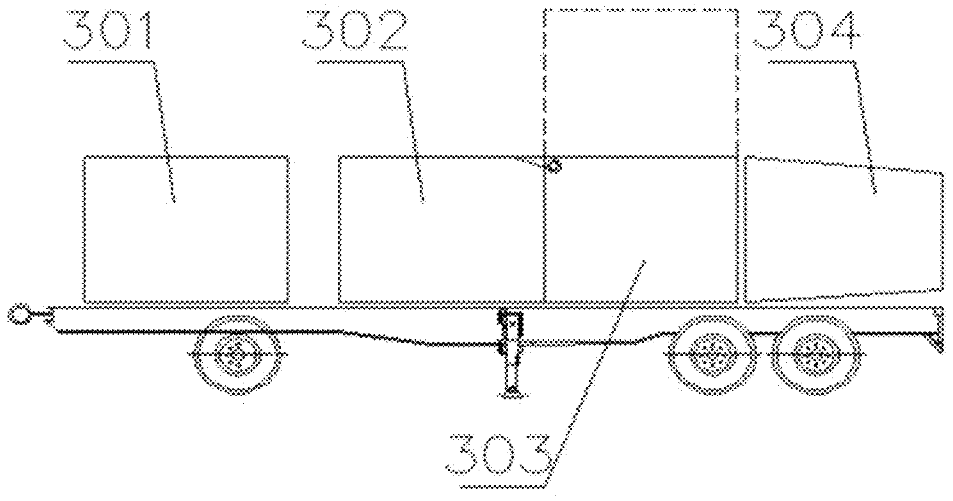
FIG. 4 is a schematic structural diagram of an exhaust transportation unit provided by at least one embodiment of the present disclosure.

Wherein, 100: turbine generation transportation unit; 101: intake component; 102: intake joint; 103: gas turbine; 104: generator; 105: electric power control system; 106: First transport vehicle; 107: Control system; 108: Electric power unit; 109: Intake filter; 110: Intake silence; 111: travel direction end of the first transport vehicle; 112: output end of the gas turbine; 113: input end of the generator; 200: auxiliary system transportation unit; 201: gas supply skid; 202: water washing system; 203: fire fighting system; 204: lubrication system; 205: ventilation system; 206: other auxiliary system; 300: exhaust transportation unit; 301: mobile accessory; 302: exhaust stack; 303: exhaust silencer; 304: exhaust joint; 400: exhaust; 401: volute exhaust structure; 401A: annular casing; 401B: central passage; 401C: first exhaust opening; 402: extended exhaust structure; 410: exhaust end of the gas turbine; 450: coupling

DESCRIPTION OF THE EMBODIMENTS

As shown in FIGS. 1 to 5, a system for providing mobile power, including a turbine generation transportation unit 100, an exhaust transportation unit 300 and an auxiliary system transportation unit 200; the auxiliary system transportation unit 200 and the exhaust transportation unit 300 are connected to at least one side of the turbine generation transportation unit 100; the turbine generation transportation unit 100 includes intake components 101, a gas turbine 103, a generator 104, an electric power control system 105 and a first transport vehicle; the intake components 101, the gas turbine 103 and the generator 104 are horizontally connected in sequence and disposed on the first transport vehicle; the electric power control system 105 is disposed on the first transport vehicle, specifically, the intake components 101 are disposed at a forward travel direction end 111 of the first transport vehicle and connected to the gas turbine 103 through an intake joint 102, providing the filtered combustion air for the gas turbine 103. No elbow is used in the connection of air inlet to ensure steady flow and reduce pressure loss. The installation of the intake components 101 is a more time-consuming and laborious part of the entire mobile power system. Therefore, in the technical solution of the present invention, the intake components 101 are arranged on the same transport vehicle and connected through the intake joints 102, and then directly transported to customer site, effectively saving the installation time at customer site. On the same transport vehicle, the intake components 101 are horizontally connected to the gas turbine 103, also facilitating the transportation of the turbine generation transportation unit 100. The auxiliary system transportation unit 200 is connected to the turbine generation transportation unit 100 through a quick-detachable joint. The generator 104 is located at the output shaft side of the gas turbine 103, and connected through a countershaft, and a shaft alignment is conducted before delivery, reducing the difficulty of field assembly and shortening the assembly time. The electric power control system 105 is integrated on the turbine generation transportation unit 100, avoiding extensive field wiring work, and also extending the service life of electrical elements. Hoisting work is avoided in the overall design of the mobile power system, reducing the difficulty of field operation, and improving the convenience of docking and installation.

An electric power unit and a control system are integrated on the electric power control system 105. The electric power unit is configured to output electric power from the generator 104, and the control system includes a gas turbine control unit and a generator control unit.

The exhaust transportation unit 300 includes a mobile accessory 301, an exhaust stack 302, an exhaust silencer 303, an exhaust joint 304 and a second transport vehicle, wherein the mobile accessory 301, the exhaust stack 302, the exhaust silencer 303 and the exhaust joint 304 are disposed on the second transport vehicle. The mobile accessory 301 mainly includes hoses, cables and the like used for connecting the auxiliary system transportation unit 200 and the turbine generation transportation unit 100, so that the connection hoses and cables at power supply sites can be effectively arranged and collected together to reduce the workload required for connecting the cables and hoses at sites. The mobile accessory 301 includes cable reels, manifold baskets, manifold brackets and the like used for the storage of cables, hoses and the like.

Figure 5:
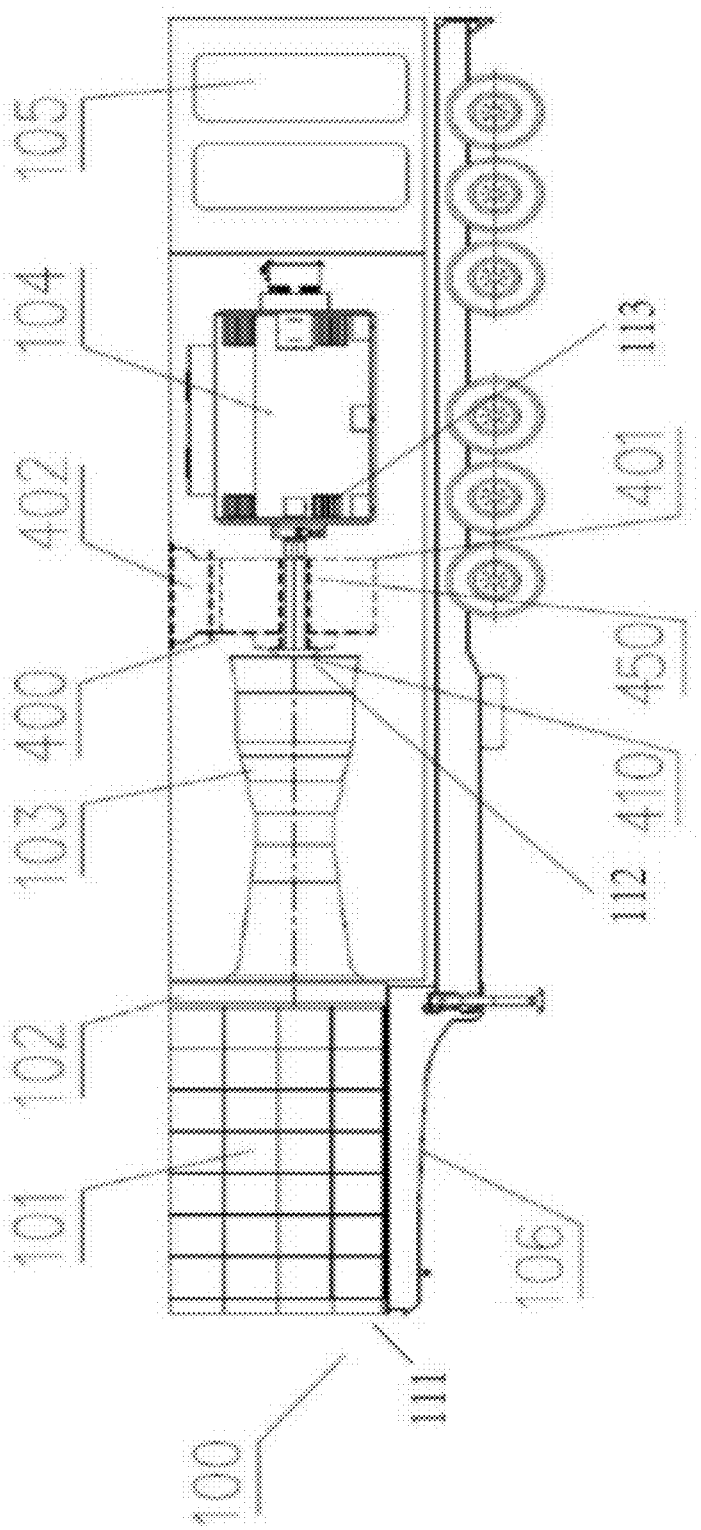
FIG. 5 is a schematic structural diagram of a turbine generation transportation unit provided by at least one embodiment of the present disclosure.

As shown in FIG. 5, The intake components 101 include an intake silencer 110 and an intake filter 109 which are connected to each other.

The auxiliary system transportation unit 200 includes a gas supply skid 201, a water washing system 202, a fire fighting system 203, a lubrication system 204, a ventilation system 205, other auxiliary system 206 and a third transport vehicle, wherein the gas supply skid 201, the water washing system 202, the fire fighting system 203, the lubrication system 204, the ventilation system 205 and the other auxiliary system 206 are disposed on the third transport vehicle. The other auxiliary system 206 has an adjustable spatial layout, which is used to assist in the installation of parts of the electric power control system 105 on the turbine generation transportation unit 100 according to the actual space environment of the customer site, but not used as the installation location of the main or/and important components or/and components with complex connection and installation relationship in the electric power control system 105. The auxiliary system transportation unit 200 can also be provided with a water injection system, an instrument wind system and a hydraulic system according to actual needs. The lubrication system 204 provides lubrication for the gas turbine 103 and the generator 104. The ventilation system 205 is used to ventilate the interior of the cabin of the turbine generation transportation unit 100, and is connected to the cabin of the turbine generation transportation unit 100 through ventilation hoses.

The gas supply skid 201, the water washing system 202 and the fire fighting system 203 are disposed at the front side of the third transport vehicle. The gas supply skid 201 provides fuels for the gas turbine 103. The water washing system 202 is used to clean the gas turbine 103. The fire fighting system 203 is used for the fire protection within the cabin of the turbine generation transportation unit 100.

The exhaust stack 302 is hinged with the exhaust silencer 303. During transportation, the exhaust stack 302 and the exhaust silencer 303 are arranged side by side, while in working state, the exhaust stack 302 is disposed on the top of the exhaust silencer 303. The connection between the exhaust stack 302 and the exhaust silencer 303 of two different location relationships at transportation and working states not only meets the requirements of road transportation, but also meets the requirements of exhaust gas emission during operations.

The exhaust stack 302 can rotate 180° around the hinge point. When rotation, auxiliary mechanisms such as hydraulic cylinders can be used to make the exhaust stack 302 rotate around the hinge point, so that the exhaust stack 302 can be disposed on the top of the exhaust silencer 303, then the interface between them can be sealed with a locking device.

Depending on the customer's site environment, exhaust joint 304 of different shapes can be arranged. The shape of the exhaust joint 304 is a vertical cylinder or an elbow, so that the exhaust transportation unit 300 can be connected to the turbine generation transportation unit 100 in a T-shape or side by side, so as to better meet the site environment of different customers. In embodiment 1, the exhaust joint 304 is designed as a vertical cylinder, the tail of the exhaust transportation unit 300 is connected to the turbine generation transportation unit 100 in a T-shape. In embodiment 2, the exhaust joint 304 is designed as an elbow, the exhaust transportation unit 300 is connected to the turbine generation transportation unit 100 side by side through the elbow exhaust joint 304 at the tail.

In some embodiments, as shown in FIG. 5, a first output end 112 of the gas turbine and a second input end 113 of the generator may be connected through a coupling 450 without using a mechanical device such as a gearbox for connection, which can simplify the connection structure of the gas turbine and the generator. In some other examples, the two ends of the coupling 450 may be detachably connected to the first output end of the gas turbine and the second input end of the generator through bolts or splines, respectively. In one embodiment, the coupling is a shaft.

In some embodiments, as shown in FIG. 5, the turbine generation transportation unit may further include an exhaust passage 400 disposed between the gas turbine and the generator. For example, the gas turbine may further include an exhaust end 410. The exhaust passage 400 may be connected with the exhaust end 410, for example, via flanges, for releasing exhaust gas of the gas turbine.

Figure 6:
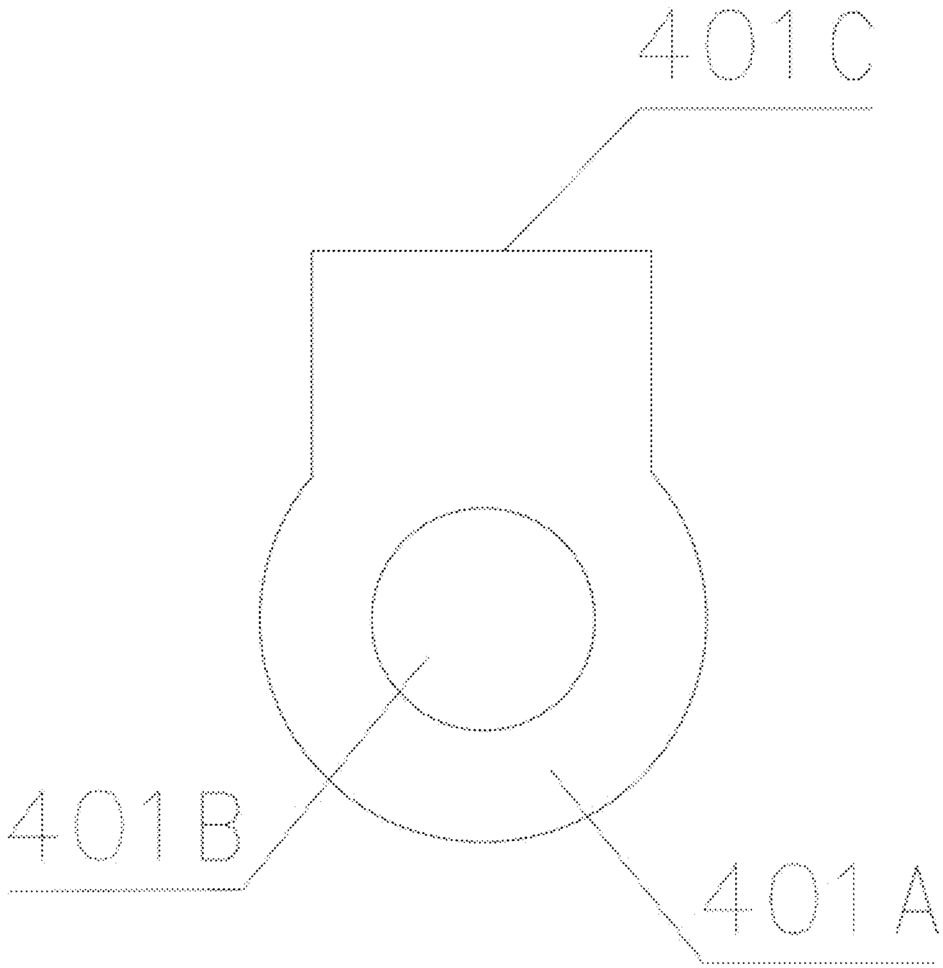
FIG. 6 is a front view of a volute exhaust structure provided by at least one embodiment of the present disclosure.

In some embodiments, as shown in FIG. 5, the exhaust passage 400 may include a volute exhaust structure 401. FIG. 6 shows a front view of an exemplar volute exhaust structure 401 according to some embodiments of the present disclosure. As shown by FIG. 6, the volute exhaust structure 401 may include an annular casing 401A. The annular casing 401A may include a central passage 401B and a first exhaust opening 401C. The coupling 450 may be arranged to pass through the central passage 401B to connect the gas turbine to the electric generator. The first output end 410 of the gas turbine may be connected to the second input end of the electric generator. Under such a configuration, the annular casing 401A would surround the coupling 450.

As a result, the volute exhaust structure 401 may form a channel for the coupling 450 to pass, and the volute exhaust structure 401 can assist in guiding and releasing the exhaust of the gas turbine and at the same time facilitate the driving power connection between the gas turbine and the electric generator. The overall connection configuration of the gas turbine and the electric generator is thus compactly arranged. The overall space occupied by the gas turbine, the exhaust passage, and the generator may be reduced. A single casing may be used for easier transportation.

In some embodiments, as shown in FIG. 5, the volute exhaust structure 401 and the generator may be spaced apart, thereby preventing the exhaust heat in the volute exhaust structure 401 from affecting the operation of the electric generator and causing adverse effects.

In some embodiments, as shown in FIG. 5, the exhaust passage 400 may further include an extended exhaust structure 402. The extended exhaust structure 402 may include opposite second exhaust opening and third exhaust opening. The second exhaust opening may communicate with the first exhaust opening 401C. For example, the opening size of the second exhaust opening and the first exhaust opening 401C may be substantially the same, thereby facilitating the connection of the second exhaust opening and the first exhaust opening 401C. The opening size of the third exhaust opening may be larger than that of the second exhaust opening.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof

What is claimed is:

1. A system for providing mobile power, comprising a turbine generation transportation unit, an exhaust transportation unit and an auxiliary system transportation unit, wherein the auxiliary system transportation unit and the exhaust transportation unit are connected to at least one side of the turbine generation transportation unit;

the turbine generation transportation unit comprises intake components, a gas turbine, a generator and a first transport vehicle, and the intake components, the gas turbine and the generator are connected in sequence and disposed on the first transport vehicle;

the intake components are configured to filter combustion air to the gas turbine;

the intake components are disposed on a travel direction end of the first transport vehicle and are connected to the gas turbine through intake joints;

an output end of the gas turbine is connected to an input end of the generator through a shaft;

the turbine generation transportation unit further comprises an exhaust passage between the gas turbine and the generator;

the exhaust passage comprises a volute exhaust structure including an annular casing, a central passage in the annular casing, and a first exhaust opening;

the shaft passes through the central passage while being surrounded by the annular casing to connect the gas turbine and the generator.

2. The system for providing mobile power according to claim 1, wherein the intake components comprise an intake silencer and an intake filter.

3. The system for providing mobile power according to claim 1, wherein the turbine generation transportation unit further comprises an electric power unit and a control system, and the electric power unit is configured to output electric power from the generator.

4. The turbine generation transportation unit according to claim 1, wherein the intake joints are straight cylindrical intake joints.

5. The system for providing mobile power according to claim 1, wherein the exhaust transportation unit comprises an exhaust stack, an exhaust silencer, an exhaust joint and a second transport vehicle, and the exhaust stack, the exhaust silencer and the exhaust joint are disposed on the second transport vehicle, and wherein the exhaust stack is hinged with the exhaust silencer; during transportation, the exhaust stack and the exhaust silencer are configured to be arranged side by side, and during working state, the exhaust stack is configured to be disposed on the top of the exhaust silencer.

6. The system for providing mobile power according to claim 5, wherein the exhaust stack is configured to be capable of rotating 180° around the hinge point.

7. The system for providing mobile power according to claim 6, wherein the exhaust transportation unit further comprises a mobile accessory, and the mobile accessory is disposed on the second transport vehicle.

8. The system for providing mobile power according to claim 5, wherein the shape of the exhaust joint is a vertical cylinder or an elbow.

9. The system for providing mobile power according to claim 1, wherein the auxiliary system transportation unit comprises a gas supply skid, a water washing system, a fire fighting system, a lubrication system, a ventilation system and a third transport vehicle; the gas supply skid, the water washing system, the fire fighting system, the lubrication system, and the ventilation system are disposed on the third transport vehicle.

10. The system for providing mobile power according to claim 1, wherein the first transport vehicle is a semitrailer.

11. The system for providing mobile power according to claim 1, wherein the exhaust passage and the generator are spaced apart.

12. The system for providing mobile power according to claim 1, wherein the exhaust passage further comprises an extended exhaust structure communicating with the volute exhaust structure.

13. A turbine generation transportation unit, comprising intake components, a gas turbine, a generator and a first transport vehicle, wherein the intake components, the gas turbine and the generator are connected in sequence and disposed on the first transport vehicle;

the intake components are configured to filter combustion air to the gas turbine;

an output end of the gas turbine is connected to an input end of the generator through a shaft;

the turbine generation transportation unit further comprises an exhaust passage between the gas turbine and the generator;

the exhaust passage comprises a volute exhaust structure including an annular casing, a central passage in the annular casing, and a first exhaust opening; and the shaft passes through the central passage while being surrounded by the annular casing to connect the gas turbine and the generator.

14. The turbine generation transportation unit according to claim 13, wherein the intake components are disposed on a travel direction end of the first transport vehicle and are connected to the gas turbine through intake joints.

15. The turbine generation transportation unit according to claim 14, wherein the intake joints are straight cylindrical intake joints.

16. The turbine generation transportation unit according to claim 13, further comprising an electric power unit and a control system, the electric power unit is configured to output electric power from the generator, and the control system comprises a gas turbine control unit and a generator control unit.

17. The turbine generation transportation unit according to claim 13, wherein the first transport vehicle is a semi-trailer.

18. The turbine generation transportation unit according to claim 13, wherein the exhaust passage and the generator are spaced apart.

* * * * *